Figure 1:
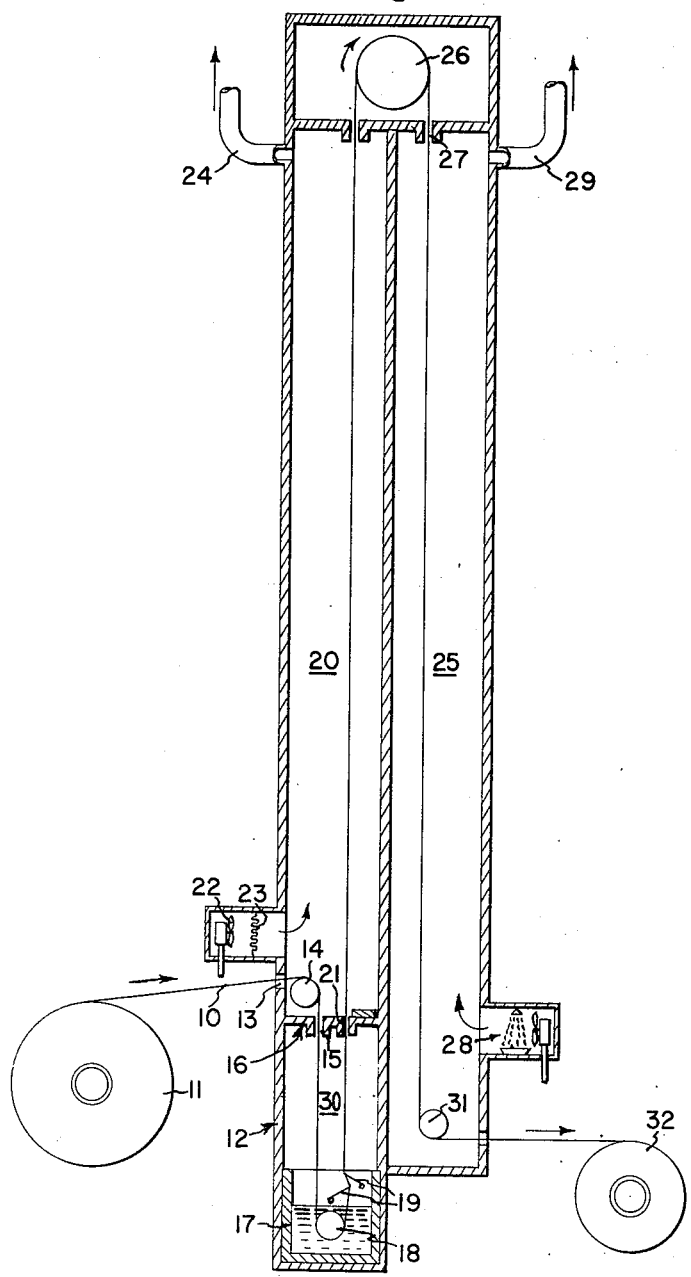

Oct. 1, 1957  C. G. LEARN  2,808,340
PROCESS FOR COATING NONFIBROUS ORGANIC SHEET MATERIAL
Filed April 5, 1955

INVENTOR
CLYDE GEORGE LEARN

BY *Herbert McD. Heen*

ATTORNEY

United States Patent Office 2,808,340
Patented Oct. 1, 1957

2,808,340

PROCESS FOR COATING NONFIBROUS ORGANIC SHEET MATERIAL

Clyde George Learn, Chesterfield County, Va., assignor to E. I. du Pont de Nemours and Company, Wilmington, Del., a corporation of Delaware Application April 5, 1955, Serial No. 499,338

7 Claims. (Cl. 117—47)

This invention relates to coating nonfibrous, organic sheet materials and more particularly to a method and apparatus for coating films, webs or sheets of regenerated cellulose with film-forming compositions.

Regenerated cellulose sheet material (cellophane) as it comes from the casting machine possesses properties which limit its utility essentially to ornamental and sanitary protective applications. The prior art, however, is replete with coating compositions which serve to make the film more commercially attractive. There are coatings to reduce the moisture permeability of the film, to increase its chemical resistance, to improve its heat-sealability, to add strength and toughness to the film and to improve the crease resistance of the film. Some coating compositions are composed of cellulose derivatives such as nitrocellulose or cellulose acetate in combination with waxes, resins, plasticizers and the like. Some are composed of vinylidene chloride copolymers and the like. Other important coating compositions for regenerated cellulose employ various polyethylene compositions. In general, the coating compositions contain film-forming materials which form an adherent layer over the regenerated cellulose base film.

The cellulose derivatives and the vinylidene chloride copolymers are usually applied by passing the regenerated cellulose film through a dip tank containing the film-forming composition dissolved in an organic solvent. The solvent is subsequently evaporated leaving the base film coated with the film-forming composition.

Polyethylene compositions, however, cannot be applied by the dipping methods known to the prior art. Dipping usually results in gelation of the polyethylene composition on the surface of the film in an undesirable nonuniform manner. Attempts to smooth the polyethylene coating only result in smears. As a result the art has been compelled to use tedious and expensive methods to apply polyethylene compositions to regenerated cellulose film and other sheet materials. One method known as the laminating technique involves first applying an adherent layer to the sheet material followed by applying the polyethylene composition in sheet form or in solution. For this method it is necessary to use a material that will bond the polyethylene composition to the sheet material. Usually the adherent layer will lower the transparency, the toughness and the strength of the base film. The second method known as the melt-spreading technique attempts to avoid the intermediate adherent layer. This method provides for spreading the molten polyethylene composition on the sheet material. However, a polyethylene composition is sufficiently viscous to spread only at very high temperatures. The process therefore involves temperatures of 90° C. to 160° C. Pressing the polyethylene coating on a thin fragile base film at these high temperatures requires care and time. As a result the process is quite expensive.

The object of this invention is to provide an improved dipping process for coating nonfibrous, organic sheet materials with film-forming compositions. Another object is to provide a dipping process for coating regenerated cellulose film with polyethylene compositions. A further object is to provide an apparatus for coating regenerated cellulose film with film-forming materials from organic solutions of the film-forming materials. Other objects will appear hereinafter.

The objects are accomplished by heating the sheet material; exposing the sheet material to an atmosphere containing vapor of the solvent for the film-forming composition to raise the temperature of the sheet material to within 10° C., preferably equal to the temperature of the solution of the film-forming composition; dipping the sheet material in the solution of the film-forming composition; removing excess solution of the film-forming composition from the surface of the sheet material; exposing the coated sheet material to the atmosphere containing vapor of the solvent for the film-forming composition to maintain the coated sheet material at a temperature within 10° C., preferably equal to the temperature of the solution of the film-forming composition for a period at least equal to, preferably greater than 1.5 times the period of dipping; drying the coated sheet material; and humidifying the dried, coated sheet material.

The apparatus comprises, in combination, successively, means to heat the sheet material, means to expose the sheet material to an atmosphere containing vapor of the solvent for the film-forming composition, means to remove excess solution of the film-forming composition from the surface of the sheet material, means to expose the coated sheet material to an atmosphere containing vapor of the solvent for the film-forming composition, means to dry said coated material, and means to humidify the coated material.

In more specific terms, the apparatus comprises a coating tower in three sections: a coating section wherein a jacketed tank containing the solution of the film-forming composition is located; a drying section wherein hot, dry air is circulated; and a conditioning section wherein moist air is circulated; an opening in the lower portion of the drying section for entry of the base film into the coating tower; an enclosure within said tower to separate the coating section from the drying section; openings in the enclosure for the base film to pass into and out of the coating section; an area containing solvent vapor disposed between said enclosure and the solution in the jacketed tank; and doctoring means located as close as feasible to the jacketed tank to remove excess coating from the surface of the sheet material.

The process and apparatus are particularly advantageous for coating regenerated cellulose film with polyethylene compositions. The invention therefore, will be described with regard to coating regenerated cellulose film with polyethylene compositions. However, the invention is also applicable to coating other nonfibrous organic sheet materials such as polyester films and cellulose ester films with a variety of film-forming materials from organic solutions.

For the purpose of this invention, polyethylene compositions may be defined as solid compositions which contain the solid polymers of ethylene, i. e., solid polyethylene and/or the solid pyrolysis products thereof, and, if desired, other ingredients such as natural and synthetic plastic materials, e. g., natural or synthetic uncured rubber, waxes, oils, resins; dyes and pigments; oxidation inhibitors and mineral fillers such as finely powdered calcium carbonate or titanium dioxide.

The figure is a plan view of one form of apparatus suitable for carrying out this invention.

In the embodiment shown in the figure, uncoated regenerated cellulose film 10, the so-called base film, is unwound from the roll 11 and enters the coating tower 12 through an opening 13. It should be noted that the film enters at the lower portion of the dryer section 20 of the tower. Here, the film receives preliminary heating by the circulating hot, dry air. Next, the film passes over roll 14 and enters the coating section 30 of the tower through the slot 15. The solvent vapor above the dip tank 17 serves to keep this section well heated. The film, heated first by passing through the lower portion of the drying section 20, has air entrained on it as it enters the coating section 30. The entrained air is blended with the rich solvent vapor while the film is heated further by the solvent vapor prior to passing into the dip tank 17. The dip tank 17, containing a solution of polyethylene in toluene at a temperature of over 100° C., is well insulated by a surrounding jacket. The polyethylene solution is continuously circulated through a circulating system, not shown, where the temperature of the solution is controlled and where the solution is replenished. The film, heated to the temperature of the coating compartment, about 100° C., passes into the dip tank; around roll 18; and upwardly between doctor knives 19, preferably heated to about the temperature of the polyethylene solution.

To prevent premature gelation of the coating, the doctor knives are located as close as feasible to the bath. The gap between knife blades is about 1¾ inches; the essential edges are ¼-rounded to prevent streaking or scratching; and the edges overlap slightly. If no overlap were used, excessive coating solution would remain on the base film. Extreme overlapping, on the other hand, removes too much coating solution. The overlap is adjusted to provide the desired coating thickness. As an alternative to doctor knives, doctor rolls may be used in a similar manner.

After passing between the doctor knives 19 where excess coating is metered from the surface of the film and the coating remaining on the film is made smooth, the film again passes through the area containing solvent vapor to maintain the high temperature of the film for a period at least equal to the dipping period. The coated film then passes into the dryer section 20 through an adjustable slot 21. Hot, dry air, heated by the heater 23, is circulated through this section by means of a blower 22. The air serves to dry the coated film and to carry the solvent vapor through the opening 24. The solvent vapor may be recovered from the solvent-air mixture in a separate operation.

Excessive evaporation of solvent is prevented by the enclosure 16 containing the narrow slots 15 and 21, which slots permit film to enter and leave the coating section of the tower. It has been found that this expedient, an enclosure above the dip tank, will cut the loss of solvent vapor in half.

After being dried in the dryer section 20, the coated film passes over roll 26 and downwardly through the slot 27 into the conditioning or humidifying section 25 of the tower. Conditioning serves to replace the moisture lost by the base film during drying. It is accomplished by circulating moist air into the section at 28 and out at 29. The conditioned coated film passes under roll 31 and is collected on the roll 32.

It may be desirable to apply the compositions to one side only of the sheet material. This is easily accomplished by merely raising the dip roll 18 so that only a portion of the roll is below the level of the polyethylene solution. In addition, a heated roll replaces the doctor knife on the uncoated side of the sheet material.

The speed used during the continuous operation described was 90 feet/minute. However, speeds ranging from 10 to 300 feet/minute may be used with equally effective results. The speed is usually adjusted to provide adequate solvent removal from the coated sheet.

The coatings may be applied in thicknesses ranging from 3 to 30 grams/square meter (0.1 to 1.0 mil.). The selection of the thickness to be used will depend on the properties that one desires for the coated product. Thicker coatings provide greater impermeability to water vapor; thinner coatings, greater flexibility.

The result of the process is a smooth, adherent coating of polyethylene on a regenerated cellulose film. The coated film displays improved strength, toughness, moistureproofness, resistance to chemicals and creasing, as well as improved clarity.

The process is of particular advantage for applying polyethylene compositions. It is simple when compared to the previous techniques used. No intermediate adhesive layer is required. Melting and pressing the polyethylene composition on the base film is avoided. Furthermore, the process lends itself to continuous operation.

The process is also surprisingly effective for coating sheet materials with other film-forming materials such as nitrocellulose, cellulose acetate and polymeric compositions such as vinylidene chloride copolymers. When used for coating these film-forming materials on regenerated cellulose film, the process provides a marked improvement in clarity over previous dipping processes.

The critical features of the process, which serve to distinguish it from prior processes are:

1. Preheating the sheet material.
2. Raising the temperature of the sheet material to within 10° C. of the temperature of the film-forming solution by exposure to vapor of the solvent in the film-forming solution. The step serves to blend the air entrained on the sheet material with the rich solvent vapors. This step may be implemented by providing an additional heat source such as radiant heaters in the area above the dip tank. This step seems to provide a sheet material that wets smoothly and uniformly when dipped in the film-forming solution.
3. Maintaining the temperature of coated sheet material within 10° C. of the temperature of the film-forming solution for a period at least equal to the period of dipping by exposure to solvent vapor. This step decreases the evaporation rate of solvent from the surface of the film. The result is slower, more uniform drying than heretofore accomplished. This seems to be instrumental in providing a smooth, clear, homogeneous coating on the base material.

In the embodiment described, toluene was used as the solvent and the temperature of the film-forming solution was about 100° C. However, other solvents for polyethylene may be used such as xylene, mesitylene, petroleum ether, benzene and heptane and the temperature for applying polyethylene coatings may range from 70° C. to 150° C. For applying nitrocellulose, cellulose acetate or vinylidene chloride copolymers, solvents such as toluene, methyl ethyl ketone, acetone, ethyl acetate, etc., may be used and the temperature of application may be lower. In any case, it is obvious that the solvent used must not be a solvent for the sheet material to be coated and the temperature must not be such as to destroy or harm the sheet material.

Sheet materials coated according to the present invention are suitable for use as tank linings, bottle cap seals, packaging for foodstuffs, textiles, hardware, etc.

As many widely different embodiments can be made without departing from the scope of this invention, it is understood that the invention is not limited except as defined in the appended claims.

Having fully described my invention, I claim:

1. A process for coating a nonfibrous organic sheet material selected from the group consisting of regenerated cellulose, polyester and cellulose ester films with a film-forming composition selected from the group consisting of polyethylene, nitrocellulose, cellulose acetate and vinylidene chloride copolymer compositions which comprises the successive steps of heating the sheet material; exposing the sheet material to an atmosphere containing vapor of an organic solvent for the film-forming composition to raise the temperature of the sheet material to within 10° C. of the temperature of the solution of the film-forming composition, said solvent having a preferential solvent action on said film-forming composition; dipping the sheet material into the solution of the film-forming composition; removing excess solution of the film-forming composition from the surface of the sheet material; exposing the coated sheet material to an atmosphere containing the vapor of the solvent for the film-forming composition to maintain the coated sheet material at a temperature within 10° C. of the temperature of the solution of the film-forming composition for a period at least equal to the period of dipping; drying the coated sheet material; and humidifying the dried, coated sheet material.

2. A process as in claim 1 wherein the sheet material is raised to and maintained at a temperature substantially equal to the temperature of the solution of the film-forming composition prior to and subsequent to dipping.

3. A process as in claim 1 wherein the coated sheet material is maintained at a temperature within 10° C. of the temperature of the solution of the film-forming composition for a period of at least 1.5 times the period of dipping.

4. A process for coating regenerated cellulose film with a polyethylene composition which comprises the successive steps of heating the regenerated cellulose film; exposing said film to an atmosphere containing vapor of an organic solvent for the polyethylene composition to raise the temperature of the film to within 10° C. of the temperature of the solution of the polyethylene composition, said solvent having a preferential solvent action on said polyethylene composition; dipping the regenerated cellulose film into the solution of the polyethylene composition, said solution at a temperature of 70° C.–150° C.; removing excess solution of the polyethylene composition from the surface of the regenerated cellulose film; exposing the coated film to an atmosphere containing the vapor of the solvent for the polyethylene composition to maintain the coated film at a temperature within 10° C. of the temperature of the solution of the polyethylene composition for a period at least equal to the period of dipping; drying the coated film; and humidifying the dried, coated film.

5. A process as in claim 4 wherein the film is raised to and maintained at a temperature substantially equal to the temperature of the solution of the film-forming composition prior to and subsequent to dipping.

6. A process as in claim 4 wherein the coated film is maintained at a temperature within 10° C. of the temperature of the solution of the film-forming composition for a period at least 1.5 times the period of dipping.

7. A process for coating regenerated cellulose film with a polyethylene composition which comprises the successive steps of heating the regenerated cellulose film; exposing said film to an atmosphere containing toluene vapor to raise the temperature of the film to 90° C.–100° C.; dipping the regenerated cellulose film into the solution of the polyethylene composition in toluene, said solution at a temperature of about 100° C.; removing excess solution from the surface of the regenerated cellulose film; exposing the coated film to an atmosphere containing the toluene vapor to maintain the coated film at a temperature of 90° C.–100° C. for a period at least equal to the period of dipping; drying the coated film; and humidifying the dried, coated film.

References Cited in the file of this patent

UNITED STATES PATENTS

| | | |
|---|---|---|
| 1,826,697 | Charch | Oct. 6, 1931 |
| 2,129,249 | Trahey | Sept. 6, 1938 |
| 2,138,578 | Hershberger | Nov. 29, 1938 |
| 2,367,819 | Carter | Jan. 23, 1945 |

FOREIGN PATENTS

| | | |
|---|---|---|
| 1,068,812 | France | July 1, 1954 |